United States Patent
Gardner et al.

(10) Patent No.: US 7,326,283 B2
(45) Date of Patent: Feb. 5, 2008

(54) SPINNING IMPINGEMENT MULTIPHASE CONTACTING DEVICE

(75) Inventors: Nelson C. Gardner, Cleveland, OH (US); Xintian Zheng, Cleveland, OH (US); Robert E. Harris, Chagrin Falls, OH (US)

(73) Assignee: Cleveland Gas Systems, LLC, Cleveland, OH (US)

( * ) Notice: Subject to any disclaimer, the term of this patent is extended or adjusted under 35 U.S.C. 154(b) by 172 days.

(21) Appl. No.: 10/971,385

(22) Filed: Oct. 22, 2004

(65) Prior Publication Data

US 2005/0116364 A1    Jun. 2, 2005

Related U.S. Application Data

(60) Provisional application No. 60/514,213, filed on Oct. 24, 2003.

(51) Int. Cl.
*B01D 19/00* (2006.01)
*B01D 3/08* (2006.01)
*B01F 3/04* (2006.01)
*C02F 1/20* (2006.01)

(52) U.S. Cl. .................... 96/189; 96/202; 96/214; 96/216; 95/264; 95/244; 95/258; 261/89; 210/512.3

(58) Field of Classification Search .......... 95/244, 95/264, 257, 258, 245; 96/202, 189, 216, 96/217, 214; 261/89, 90; 210/512.3; 422/231
See application file for complete search history.

(56) References Cited

U.S. PATENT DOCUMENTS

| | | | |
|---|---|---|---|
| 2,941,872 A | 6/1960 | Pilo et al. | |
| 4,197,063 A | 4/1980 | Davidson | |
| 4,283,255 A * | 8/1981 | Ramshaw et al. | 203/49 |
| 4,356,133 A | 10/1982 | Cowen et al. | |
| 4,400,275 A | 8/1983 | Ramshaw et al. | |
| 4,692,283 A * | 9/1987 | Wem et al. | 261/89 |
| 4,715,869 A * | 12/1987 | Ramshaw | 95/263 |
| 4,908,048 A | 3/1990 | Hofmann et al. | |
| 5,000,766 A | 3/1991 | Yano et al. | |
| 5,190,515 A | 3/1993 | Eaton et al. | |
| 5,686,051 A | 11/1997 | Shiota et al. | |

(Continued)

FOREIGN PATENT DOCUMENTS

DE    19624299 A1    1/1997

(Continued)

OTHER PUBLICATIONS

Search Report for PCT/US2004/035193, Oct. 22, 2004, Cleveland Gas Systems LLC.

(Continued)

*Primary Examiner*—Duane Smith
*Assistant Examiner*—Douglas J. Theisen
(74) *Attorney, Agent, or Firm*—Calfee, Halter & Griswold, LLP (57) ABSTRACT

A spinning impingement multiphase contacting device and method for heat or mass transfer are disclosed. A first fluid, from which the transfer is to occur, is caused to impinge and be entrained in a spinning permeable element, creating a highly dispersed phase. The highly dispersed phase contacts the second fluid to cause the desired heat or mass transfer.

29 Claims, 5 Drawing Sheets

U.S. PATENT DOCUMENTS

| | | | |
|---|---|---|---|
| 5,951,921 | A | 9/1999 | Koganezawa et al. |
| 5,971,368 | A | 10/1999 | Nelson et al. |
| 6,048,513 | A | 4/2000 | Quarderer et al. |
| 6,062,546 | A | 5/2000 | Gudmundsson |
| 6,076,808 | A | 6/2000 | Porter |
| 6,508,862 | B1 * | 1/2003 | Tonkovich et al. ............ 95/106 |
| 6,808,637 | B2 | 10/2004 | Cho |
| 6,884,401 | B2 | 4/2005 | Yang et al. |
| 2005/0022666 | A1 | 2/2005 | Liu et al. |

FOREIGN PATENT DOCUMENTS

| | | |
|---|---|---|
| EP | 0 020 055 A1 | 12/1980 |
| EP | 0 048 088 | 3/1982 |
| EP | 0 078 118 A2 * | 5/1983 |
| EP | 0 089 128 A1 * | 9/1983 |
| SU | 1274708 A1 * | 7/1986 |

OTHER PUBLICATIONS

Bucklin, RW et al., "High Contactors for Selective H2S Removal and Superdehydration", 1987 Gas Conditioning Conference, 16 pgs.

Burns, JR et al., "Process intensification: operating characteristics of rotating packed beds—determination of liquid hold-up for a high voidage structured packing" Chemical Engineering Science, vol. 55, issue 13, Jul. 2000, pp. 2401-2415.

Chandra, A et al., "Characteristics of flow in a rotating packed bed (HIGEE) with split packing", Ind. Eng. Chem. Res. 44 (11) pp. 4051-4060, 2005.

Chen, J et al., "Synthesis of nano-particles of CaCO3 in a novel reactor", Process Intensification, 1997 pp. 157-164.

Chen, YH et al., "Modeling Ozone Contacting Process in a Rotating Packed Bed", Ind. Eng. Chem. Res. 2004, 43, pp. 228-236.

Chen, YS et al., "Absorption of VOCs in a rotating packed bed", Ind. Eng. Chem. Res. 2002, 41, pp. 1583-1588.

Chen, YS et al., "Micromixing in a rotating packed bed", J. Chem. Eng. of Japan, vol. 37, No. 9, pp. 1122-1128, 2004.

Cummings, CJ et al., "Polymer devolatilization and pelletization in a rotating packed bed", Process Intensification, 1999, pp. 147-158.

Dhiman, SK et al., "Process intensification in a trickle-bed reactor: Experimental studies", AIChE Journal, vol. 51, issue 12, Dec. 2005, pp. 3186-3192.

Guo, F et al., "Hydrodynamics and mass transfer in cross-flow rotating packed bed", Chem Eng. Sci. vol. 52, Nos. 21/22, pp. 3853-3859, 1997.

Lin, CC et al., "Distillation in a rotating packed bed", J. Chem. Eng. of Japan, vol. 35, No. 12, pp. 1298-1304, 2002.

Lin, CC et al., "Ozone oxidation in a rotating packed bed", J. Chem. Technol. Biotechnol. 78: pp. 138-141, 2003.

Mathure, P et al., "Comparison of mass transfer efficiency in horizontal rotating packed beds and rotating biological contactors", J. Chem. Tech. & Biotech. vol. 80, issue 4, Apr. 2005, pp. 413-419.

Schendel, RL, "Improved Selective Treating Using the HIGEE Liquid-Vapor Contactor", Fluor Engineers, Inc., 17 pgs., date unknown.

Sivalingam, G et al., "Process Intensification in a Model Trickle-Bed Reactor", Ind. Eng. Chem. Res. 2002, 41, pp. 3139-3144, 2002.

Stankiewicz, AJ et al., "Process Intensification: Transforming Chemical Engineering", Chem. Eng. Progress, Jan. 2000, pp. 22-34.

Tan, CS et al., "Absorption of carbon dioxide with iperazine and its mixtures in a rotating packed bed", Separation and Purification Technology, vol. 49, issue 2, Apr. 15, 2006, pp. 174-180.

Trent, D et al., "Commercial Operation of a rotating packed bed (RPB) and other applications of RPB technology", Process Intensification, 2001, pp. 11-19.

Yang, C, Master's Thesis, "The flow characteristics, the mass transfer characteristics, and the applications of the high gravity rotating bed", The Peking University Chemical Engineering Department, Mar. 14, 1991, 95 pgs.

Zheng, C et al., "Industrial practice of HIGRAVITEC in water deaeration", Process Intensification, 1997, pp. 273-287.

Zheng, C et al., "Pressure drop of centripetal gas flow through rotating beds", Am. Chem. Soc., Jan. 10, 2000, 6 pgs.

webpages from http://www.geocities.com/chemforum/pitrend.htm, 8 pages, printed Jun. 18, 2003, dated Sep. 25, 1997.

* cited by examiner

SPINNING IMPINGEMENT MULTIPHASE CONTACTING DEVICE

CROSS REFERENCE TO RELATED APPLICATION

This application claims the benefit under 35 U.S.C. § 119(e) of U.S. Provisional Application No. 60/514,213 filed Oct. 24, 2003, titled SPINNING IMPINGEMENT MULTIPHASE CONTACTING DEVICE, which application is hereby incorporated by reference in its entirety.

TECHNICAL FIELD OF THE INVENTION

The present invention relates to heat and mass transfer, and, more particularly, to a spinning impingement multiphase contacting device having a rotating porous solid to bring about the transfer between a liquid and a gas, and to the methods of such transfer.

BACKGROUND

Conventional mass transfer via rotating packed beds provides a first fluid and a second fluid that are introduced to a permeable element(s) having a large interfacial area, and rotating the permeable element about an axis such that fluids flow through the pores of the permeable element to enhance the mass transfer between the two fluids. The concept of mass transfer via a rotating packed bed has been applied to synthesis of hypochlorous acid. Known rotating bed technology teaches that it is important to maximize the interstitial area of the porous element to maximize the surface area upon which liquid film is formed to enhance the mass transfer between the fluids. Conventional teaching focuses on maximizing the formation of surface film.

SUMMARY OF THE INVENTION

The present invention is directed to heat and mass transfer between two fluids by increasing the interfacial area available for the transfer via dispersion of the liquid phase of the fluids.

On embodiment of the present invention is a spinning impingement apparatus and method of transport processes in which the majority of the transfer between two fluids, such as a liquid and a gas, occurs as a result of the liquid phase being dispersed, such as sheared by impingement. The invention will be described in terms of a mass transfer example of removing oxygen, as a solute, from liquid water by contact with steam. Such deoxygenated or deaerated water has a variety of applications, including boiler feed water and in the semiconductor, drug, beverage, and food industries. While the invention is described in terms of deaereating liquid water, the invention is limited only by the appended claims and may be used for a variety of applications without departing from the spirit or scope of the invention. Moreover, although the invention is described in terms of stripping a solute, oxygen, from a liquid, water, by a gas, steam, the invention may also be used with different substances and for absorption or other processes without departing from the spirit or scope of the invention.

One embodiment of the present invention includes an apparatus with a housing defining a chamber and a rotor having an upper element and lower element disposed in the chamber. A permeable element is disposed between the upper element and the lower element. In one embodiment, the permeable element is annular, defining an interior region. The permeable element is secured between the upper element and lower element, such as by a rotor spacer or ring or by stand-offs. A device to capture liquid entrained in the gas phase (demister) is provided in the interior region of the permeable element. Preferably, the demister and the permeable element are formed from foamed metal, but could be wire screen ceramic, plastic, or other material. A motor is in communication with the rotor and the secured permeable element to rotate the rotor and permeable element.

There is at least one liquid inlet having a slot or a plurality of spaced holes to allow water having dissolved oxygen to exit the inlet into the interior region. There is also at least one liquid outlet for removing deoxygenated product water from the chamber. There is at least one gas inlet for introducing steam into the chamber and at least one gas outlet for removing oxygenated steam from the interior region. The chamber is maintained at a higher pressure than the gas outlet; alternatively, the gas outlet is maintained at a lower pressure than the chamber.

A rotating liquid seal is provided between the housing and the rotor to prevent inlet steam from bypassing the permeable element and to prevent or minimize inlet liquid bypassing the rotor.

In operation, the liquid water enters the interior region through the liquid inlet and is sheared and highly dispersed by the spinning porous solid element. The spinning solid element causes a strong shearing action on the liquid, dispersing it into droplets of extremely large specific interfacial area. In contrast with the prior technology, porous media of very low surface area are preferable for generating the highly dispersed liquid droplets.

The centrifugal force associated with the rotation of the porous solid element forces the liquid water droplets radially outwardly through the porous solid where the droplets impinge on other interstitial surfaces on their way through the porous element, leading to additional shearing and dispersion Each impingement and shearing results in new dispersed liquid, generating new interfacial contacting area and enhancing the rate transfer process. This highly dispersed water phase then leaves the rotor and contacts steam as the steam enters the chamber through the gas inlet, which is at a higher pressure than the gas outlet. This differential pressure forces the steam into and through the permeable element, contacting the dispersed liquid countercurrently, through the demister in the interior region, and out the gas outlet.

The steam contacts the highly dispersed liquid, primarily within the porous solid, and the oxygen transfers from the liquid water to the steam. This interaction primarily occurs with the dispersed liquid, and much less with the liquid film formed on the interstitial surface of the porous solid, although there is some mass transfer occurring at the film boundaries. Some of the mass transfer also occurs in the volume between the rotating porous solid and the chamber walls between the liquid droplets and the incoming steam.

One embodiment of the present invention is directed to a control system that increases and decreases the flow of gas at the gas inlet based on pressure of the gas at the gas outlet.

DRAWINGS

In the accompanying drawings, which are incorporated in and constitute a part of this specification, embodiments of the invention are illustrated, which, together with a general description of the invention given above, and the detailed description given below, serve to exemplify the principles of this invention, wherein.

DETAILED DESCRIPTION OF THE INVENTION

As discussed above, the present invention will be described in terms of steam removing oxygen from liquid water. The invention is not limited to the use of steam or liquid water, and is limited only by the claims appended hereto. Other applications and variants are also envisioned without departing from the spirit or scope of the invention, including distillation, stripping, absorption, desorption, deaeration, extractions, mixing and crystallization, with and without chemical reactions, where mass and/or heat transfer are the rate-affecting limitations. Specifically contemplated are other degasifications of liquids. The liquids can range in viscosity from low viscosity solvent liquids, such as water, to highly viscous liquids such as emulsions, oils, biological fluids, and polymer melts. Gasses that can be removed by the present invention include, but are not limited to, oxygen, nitrogen, carbon dioxide, and methane.

By "mass transfer," it is meant to transfer a substance, such as a solute, from one phase to a second phase. "Turndown ratio" is the normal maximum flow divided by the minimum controllable flow. "Interfacial area" is the area available for mass or heat transfer between phases, such as the surface area of dispersed liquid droplets or of surface films. Use of the term "or" herein is the inclusive, and not the exclusive, use, unless otherwise specified. See BRYAN A. GARNER, A DICTIONARY OF MODERN LEGAL USAGE 624 (2d Ed. 1995).

Figure 1:
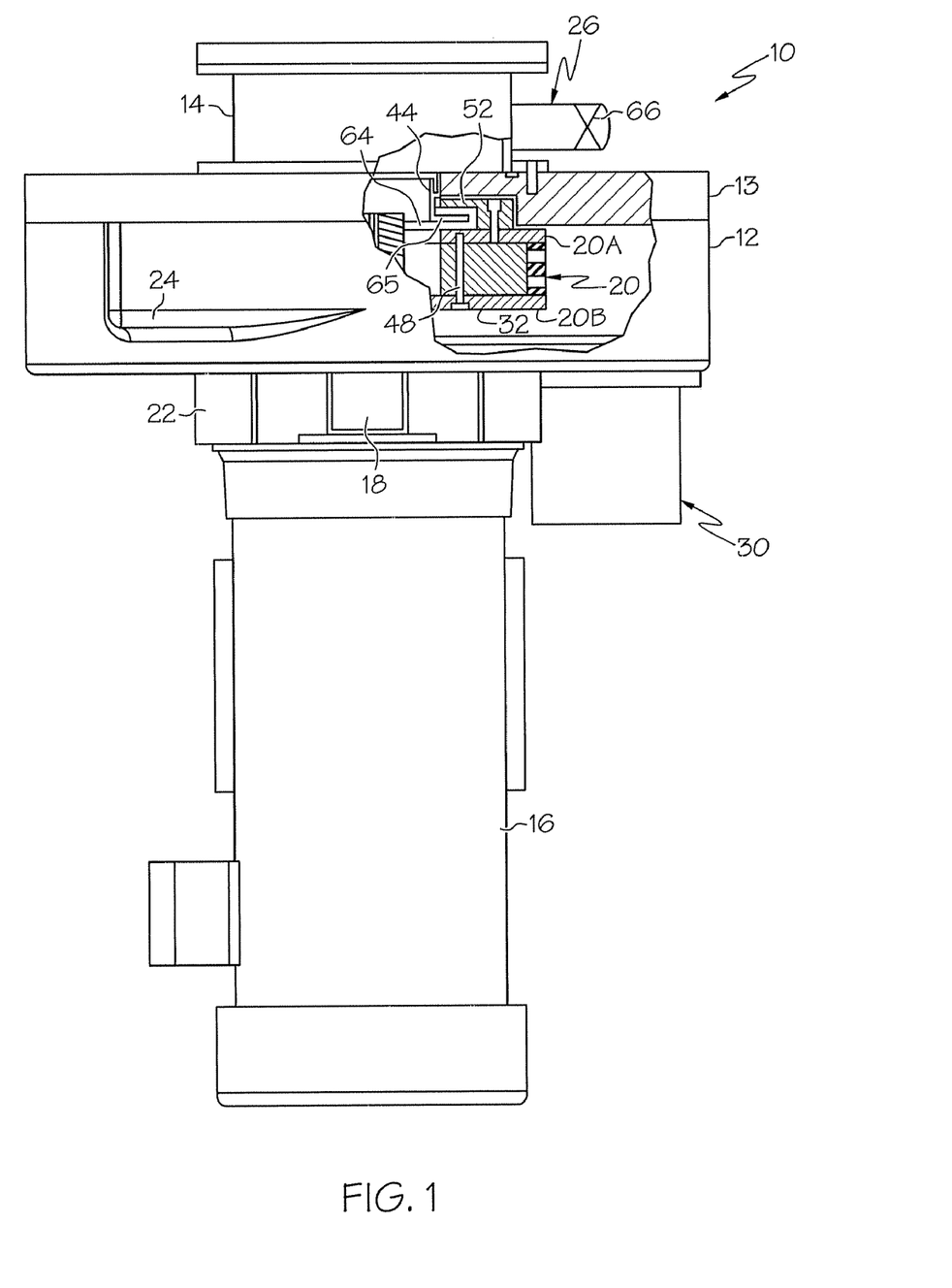
FIG. 1 illustrates an apparatus in accordance with the present invention with a partial cross-section illustrating portions of the interior of the apparatus.

FIG. 1 illustrates an exemplary apparatus 10 in accordance with the present invention for removing oxygen from liquid water. The apparatus 10 includes a housing 12, a housing cap 13, an exhaust stack 14, a motor housing 16 in which a motor (not shown) is disposed, and a rotor connection 18. The exhaust stack 14 is provided with a manifold 17 (see FIG. 2). The rotor connection 18 connects the motor (not shown) to a rotor 20 having an upper element 20A and a lower element 20B. Disposed between the housing 12 and the motor housing 16 are motor mounting feet 22 to provide support between the motor housing 16 and the housing 12.

Gas inlet 24 and gas outlet 26 provide a steam flow path to and from apparatus 10. Liquid inlet 28 (shown on FIG. 2) and liquid outlet 30 provide liquid flow paths to and from the apparatus 10. A permeable element 32 is disposed between upper element 20A and lower element 20B.

A rotating seal 44 is provided between the housing 12 and the rotor 20, and is described in greater detail below. A portion of the seal 44 is affixed to the upper element 20A and rotates with the rotor 20. A portion of the seal is affixed to the housing via housing cap 13. In one embodiment, the seal 44 (FIG. 2) is provided with one or more O-rings 46 or other deformable sealing means at the attachment with the upper element 20A.

Figure 2:
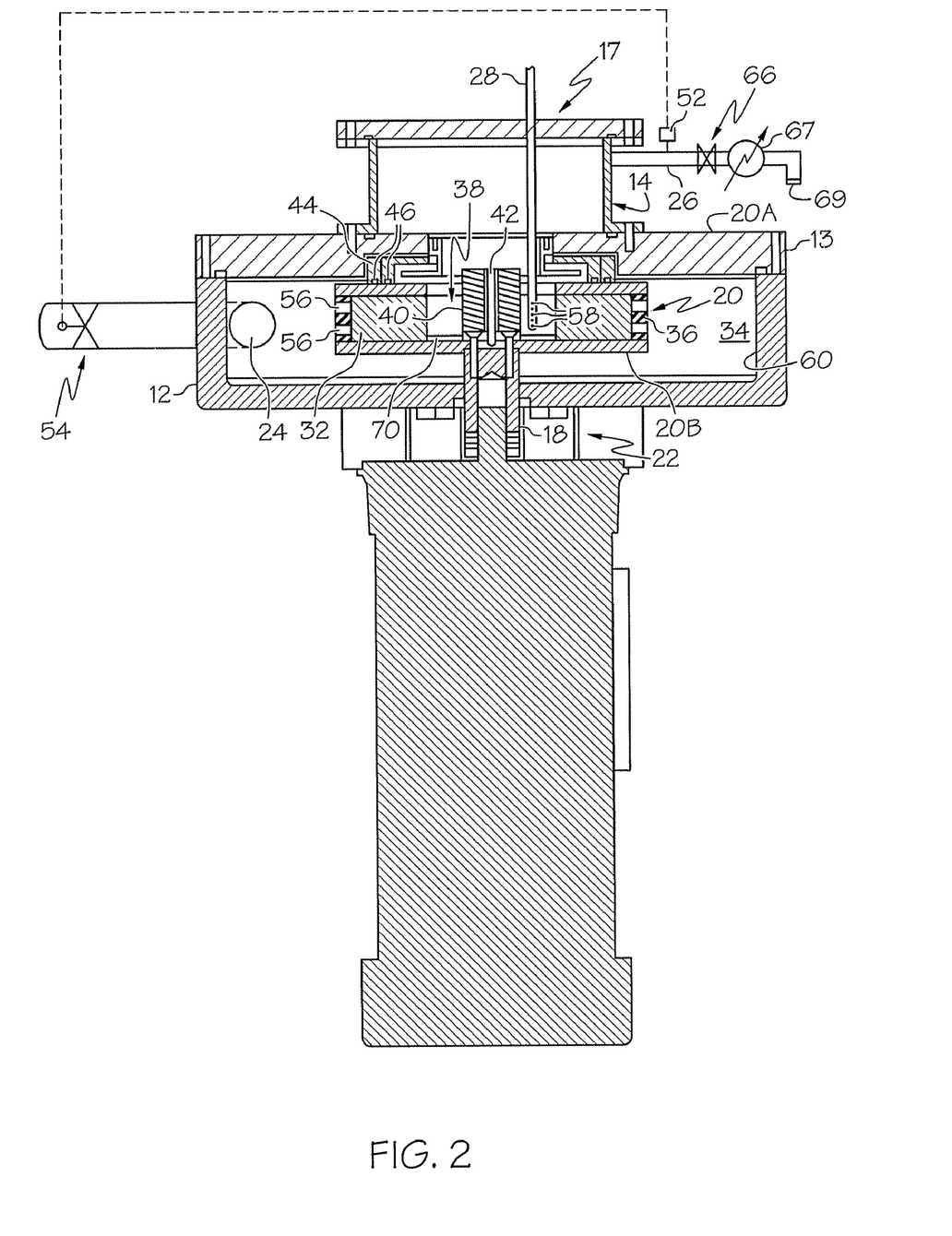
FIG. 2 is a cross-section of an apparatus in accordance with the present invention.

As illustrated in FIG. 2, the housing 12 defines a chamber 34 in which the rotor 20 is disposed and into which the gas inlet 24 exits. In one embodiment, the permeable element 32 disposed in the chamber 34 is held in place between the upper element 20A and the lower element 20B by a ring 36. Preferably, the permeable element 32 defines an interior region 38 spaced radially inwardly of the permeable element 32. A demister 40, with a demister stand-off 42 is disposed in the interior region 38. The demister 40 extends upwardly slightly beyond an inner arm 65 (FIG. 1) of the seal 44. As described in greater detail below, the demister 40 directs water into the rotor 20 and the seal 44. An inner lip 70 is provided in the interior region 38.

Figure 3:
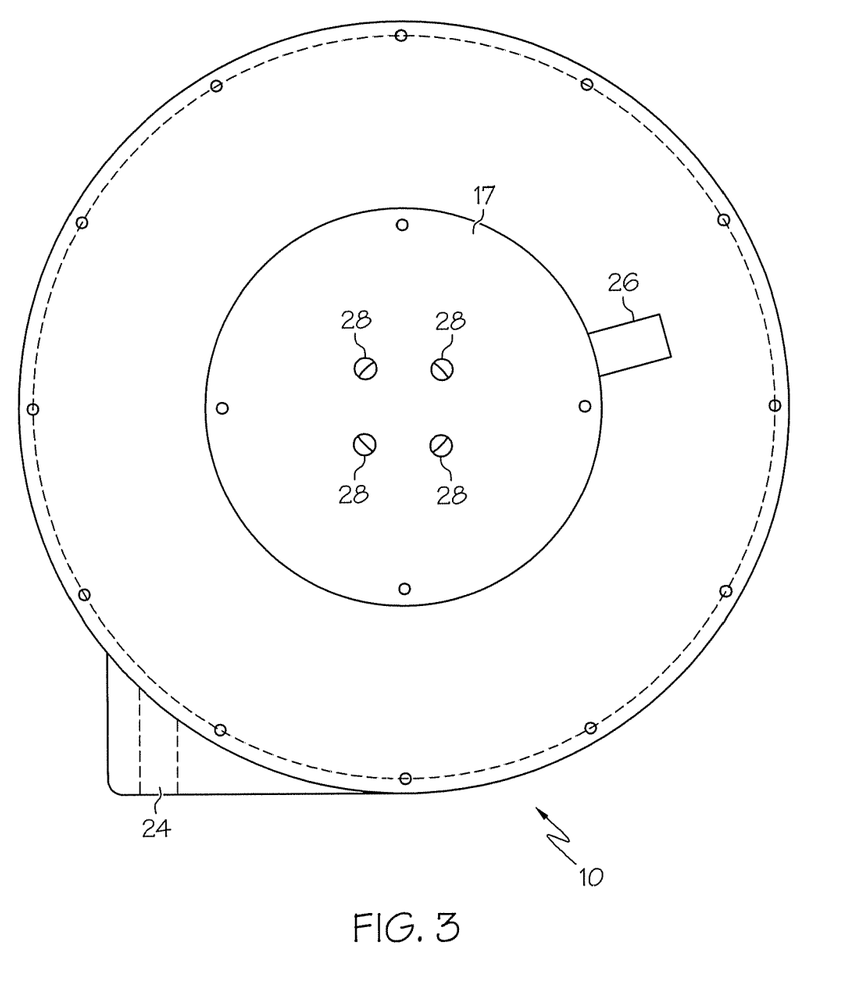
FIG. 3 is a top view of an apparatus in accordance with the present invention.

FIG. 3 illustrates a top view of the apparatus 10 of the present invention with four liquid inlets 28 disposed through the manifold 17, the gas inlet 24, and the gas outlet 26. While four liquid inlets 28 are illustrated in FIG. 3, any number of liquid inlets, including one, may be present without departing from the spirit and scope of the invention.

Figure 4:
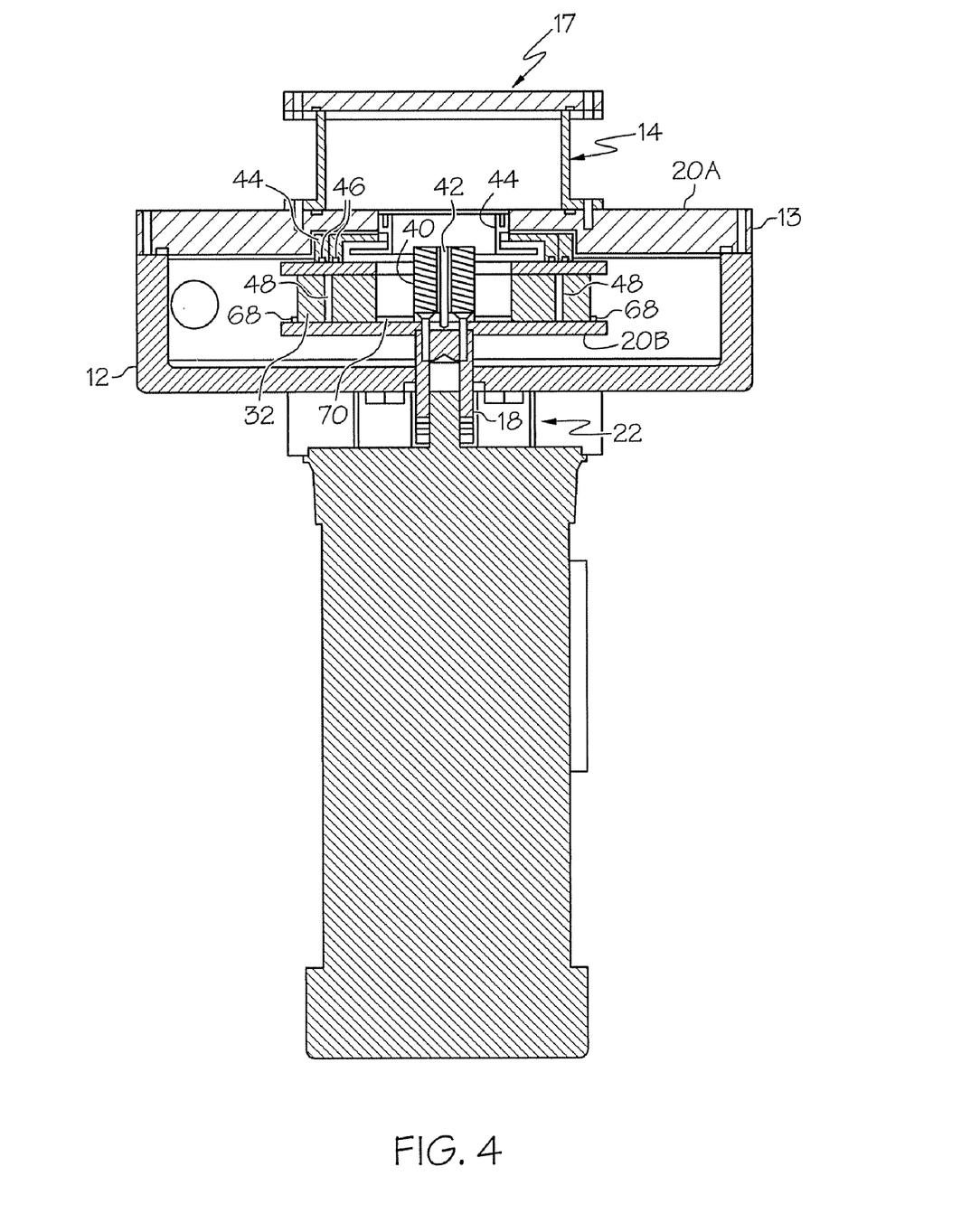
FIG. 4 is a cross-section of another embodiment of the present invention.

FIG. 4 illustrates an embodiment of the present invention in which the permeable element 32 is held in place by stand-offs 48. The stand-offs 48 pass through the permeable element 32 and separate upper element 20A from lower element 20B. The stand-offs 48 may be of any conventional material, may be solid or hollow, and of any configuration, arrangement, or attachment. In this embodiment, the ring 36 is not present.

To assist in retaining the permeable element 32 in the rotor 20, a lip 68 is present near the radially outward edge of the permeable element 32 along the bottom element 20B. The lip 68 may be continuous around the circumference of the permeable element 32 or may be discontinuously disposed around the circumference. As illustrated in FIG. 1, both the stand-offs 48 and the ring 36 may be present without departing from the spirit or scope of the invention.

Figure 5:
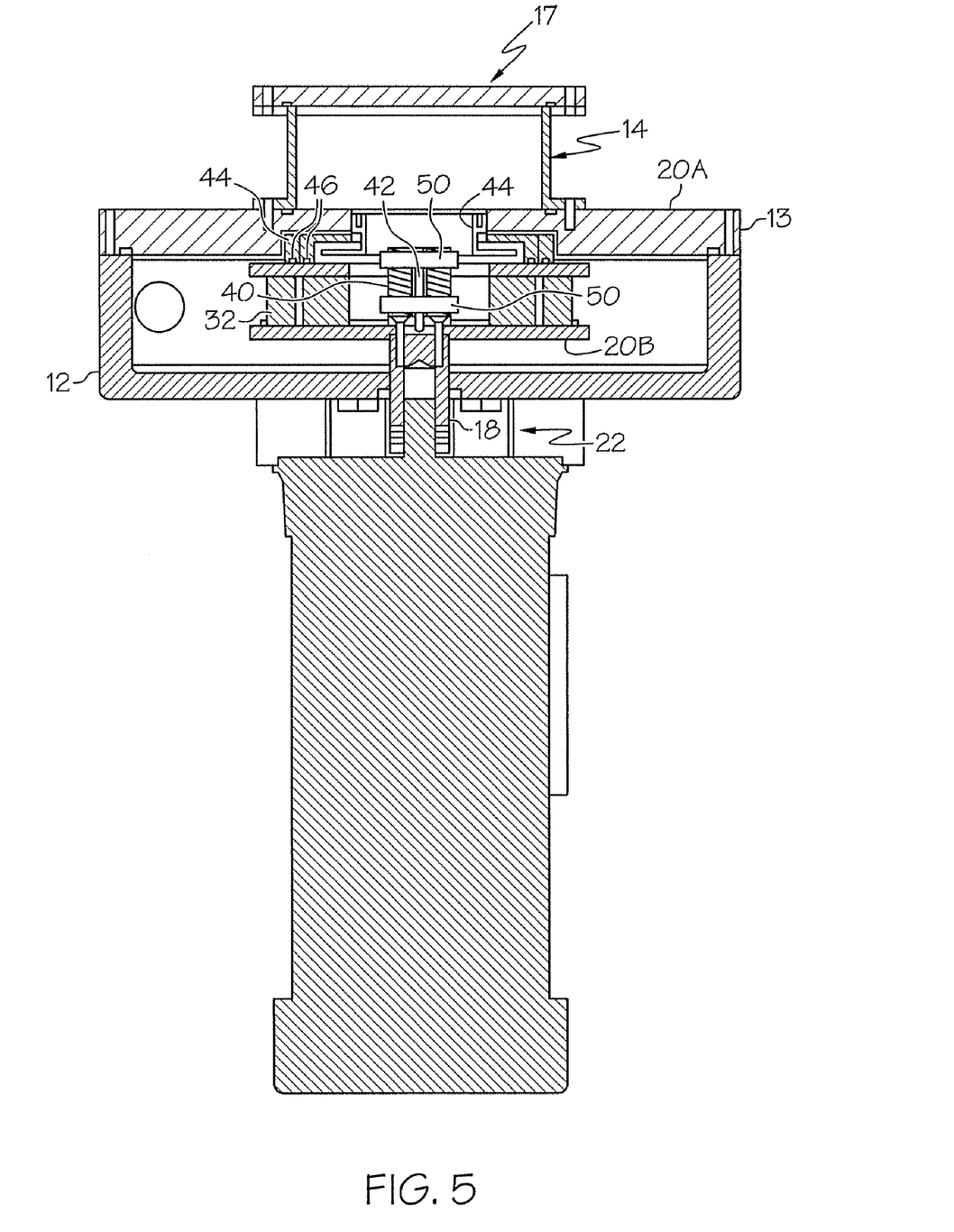
FIG. 5 is a cross-section of another embodiment of the present invention.

FIG. 5 illustrates an embodiment of the present invention in which at least one set of bearings 50 is provided to support the rotor 20 and the demister 40. The bearings provide additional support for the rotor 20 and the demister 40 when the distance between the upper element 20A and the lower element 20B is sufficient to require this support.

FIG. 2 illustrates an embodiment of the present invention in which there is a pressure detector 52 in the gas outlet 26 for detecting the pressure in the exhaust stack 14 and the gas outlet 26. The pressure detector 52 is in communication with a control valve 54 such that the flow of steam through gas inlet 24 may be controlled based upon the pressure in the exhaust stack 14 detected by the pressure detector 52, as discussed in greater detail below.

In operation, the motor (not shown) communicates with the rotor 20 via the rotor connection 18 to rotate the rotor 20. The rotor 20 rotates at such speed to produce a tangential velocity between about 5 and about 40 meters per second at an inner diameter of permeable element 32, and between about 10 and about 80 meters per second at an outer diameter of permeable element 32. The motor may be of any conventional design without departing from the spirit and scope of the invention. The manner of rotating the rotor need not be a separate conventional motor, but can be any device that provides for the rotation of the rotor 20, including a turbine, a shaft connected to another system, etc.

Steam enters the chamber 34 via gas inlet 24. The steam enters outside of the permeable element 32 and enters generally tangentially to the rotor 20 and either in the same direction as the direction of rotation of the rotor 20 or directly opposite the direction of rotation of the rotor 20, depending on the direction of rotation of the rotor 20. The chamber 34 is at a higher pressure than the pressure in the exhaust stack 14 and the gas outlet 26. This may be accomplished by providing inlet steam at a higher pressure than the pressure in the exhaust stack 14 and the gas outlet 26. This pressure differential is preferably between approximately 3.5 to 6 inches of water, and, most preferably, between about 4 and 5 inches of water.

Because of this pressure differential, the steam is forced through the holes 56 in the ring 36, through the permeable element 32 into the interior region 38, through the demister 40, into the exhaust stack 14, and out through the gas outlet 26. As the steam moves radially inwardly through the permeable element 32, the angular velocity of the steam increases, to maintain the conservation of angular momentum. In another embodiment, there is no exhaust stack 14 and the steam exits directly into the gas outlet 26. In yet another embodiment, the steam exits directly to the ambient atmosphere.

In one embodiment, the steam passes into the gas outlet 26, through a gas outlet valve 66, and into a condenser 67, where the steam is condensed. The condensed steam then passes through a condensate outlet 69. The gas outlet valve 66 may be set to provide a constant condensate flow rate, as discussed in more detail below.

The liquid water enters the inner chamber 38 through liquid inlet holes 58 in the liquid inlet 28. The holes 58 may be of any size, geometry, or configuration and may be arranged as desired without departing from the spirit and scope of the invention. For example, the holes 58 are substantially circular, with a diameter of about ⅛ inch and are linearly spaced about ⅛ inch apart. In another embodiment, the holes are configured as slots. The holes 58 need not, but may, be nozzles, and the liquid influent need not, but may, be sprayed into the permeable element 32.

The liquid water is entrained into the rotating permeable element 32 and forced radially outwardly toward the holes 56 in the ring 36. In one embodiment, the velocity of the liquid water is at least about 0.5 meters per second, and, for eample, the liquid water travels radially outwardly at about 4 to 6 meters per second. Some of the liquid water will be directed back radially inwardly toward the demister 40 after it strikes the rotating permeable element 32. The steam traveling radially inwardly and into the exhaust stack 14 will entrain some of the liquid water and carry it to the demister 40. The rotating demister 40 coalesces the liquid water and directs this liquid water radially outwardly into the rotating permeable element 32, and into the rotating seal 44, as discussed in more detail below. The inner lip 70 is provided to direct any liquid water at the bottom of the interior region 38 into the permeable element 32 and not along the lower element 20B.

The spinning permeable element 32 causes a strong shearing action on the liquid water, dispersing it into droplets of extremely large specific interfacial area, such as a mist. As the water continues to travel radially outwardly, it encounters more of the rotating permeable element 32 and the water droplets coalesce and are again sheared and dispersed. This process continues as the water droplets travel radially outwardly through rotating permeable element 32.

When the mist or dispersed liquid droplets exit the rotating permeable element 32 through the holes 56 into the chamber 34, they strike each other in the chamber 34 or strike an interior wall 60 of the chamber 34 and coalesce. As the water droplets coalesce, they accumulate at the bottom of the chamber 34 and are drained from the chamber 34 through the liquid outlet 30. If a high viscosity liquid is provided, then the combination of shearing by the permeable element 32 and the centrifugal force imparted to the liquid droplets by the rotation of the permeable element 32 may result in filaments of liquid extending through the permeable element 32 and into the chamber 34.

Liquid water does not build up in the bottom of interior region 38, because the rotating permeable element 32 entrains the liquid as soon as it leaves the holes 58 of the liquid inlet 28. As any water that collects at the bottom of the interior region 38 is directed radially outwardly, the lip 70 lifts the liquid for more effective entrainment by the rotating permeable element 32.

The shearing and dispersion of the water by the rotor 20 is influenced by the speed of rotation of the rotor 20 and the inner diameter of the permeable element 32. The velocity of the rotor 20 at the interior region 38 affects the size of the fine droplets caused by the impingement of the liquid water on the rotating permeable element 32. Because it is the velocity, and not the acceleration, of the rotor 20 that causes the shearing and dispersion of the liquid, and the velocity, and not the acceleration, of the droplets that causes the continued shearing through the permeable element, the apparatus 10 of the present invention is more readily adapted for higher volume applications by scaling up the apparatus 10 than is an apparatus dependent on the acceleration of films.

Upon startup, the apparatus 10 is not at equilibrium. The steam is provided at about 212° F. and the inlet liquid water is provided at a temperature of from about 60° F. to about 212° F. The liquid water may be provided at any temperature without departing from the spirit and scope of the invention. When the steam encounters the liquid, the steam will condense, because the liquid is at a lower temperature than the condensation temperature of the steam, and the temperature of the liquid will increase. No steam will leave the apparatus 10 and the liquid leaving the chamber 34 will not be deaerated.

The temperature of the liquid will reach the temperature of the steam, i.e., about 212° F. So if steam is available at the gas outlet 26, then equilibrium temperature has been reached and mass transfer is occurring. Deaerated water will shortly thereafter be available through liquid outlet 30. If the steam flow is too low, then the steam will all condense and there will be little overall mass transfer. Generally, the apparatus 10 operates at about 212° F. or 100° C. Conventional deaerators operate at elevated temperatures, such as 130° C., because the solubility of oxygen in liquid water decreases at increased temperature of the liquid (Henry's Law), thus enhancing the thermodynamic driving force for mass transfer. In the present invention, the mass transfer rates have been so immensely intensified by the large interfacial area of the droplets that it is possible to operate this deaerator at temperatures a degree or less above the normal boiling point, thereby allowing the use of low grade steam to bring about the separation. With the present invention, the costs associated with maintaining the higher temperature are unnecessary, because the mass transfer is efficiently conducted at a lower temperature.

It is preferable, but not required, that the permeable element 32 be a porous solid, such as a foamed metal of less than about 40 pores per inch (ppi), for example less than about 20 ppi, and as further example about 5-10 ppi. It is believed that foamed metal having as little as 3 ppi or less will be suitable for use with the present invention. The open area in the permeable element 32 must be balanced against the need for structural integrity of the permeable element 32 when rotating at speeds in accordance with the present invention. In one embodiment, the permeable element 32 is ring-shaped, or annular. Other shapes are within the spirit and scope of the invention.

Preferably, the permeable element 32 is foamed aluminum, but any foamed metal, e.g., zirconium or titanium, or conventional material for a permeable element 32 may be used. Materials such as metals, ceramics, metal/ceramic composites, glass, plastics, and combinations thereof may also be used and are within the scope of the invention. Moreover, permeable element 32 is not limited to a unitary foamed metal, but may be a mixture or alloy of any suitable material, chosen for reasons of cost, availability, or preference. Also, the permeable element 32 may be a plurality of individual elements, such as those used in conventional packed beds and including, but not limited to, springs, metal gauze or wire, rings, wire mesh, wool, tape, etc., and may be of glass, polymer or other plastic, metal, or any other suitable material selected based on cost, availability, preference, etc. The packing material/permeable element 32 should be sufficient to shear and disperse the liquid influent provided through the liquid inlet 28 into tiny droplets.

Use of foamed metal, such as aluminum, has been found to have sufficient structural integrity at the rotational speeds of the present invention, and to have ability to disperse the influent liquid sufficiently to effect efficient mass transfer. Use of this material allows rotational speeds of greater than 1750 or 1800 rpm and up to about 3500 rpm, which results in a tangential velocity of about 18.6 m/sec at the inner diameter for a permeable element 32 with an inner diameter of about 0.1 m. Conventionally, speeds of only up to 1750 rpm have been used. Use of the rotational speeds and tangential velocities of the present invention allow for reduction of the diameter of the permeable element 32.

It is believed that tangential velocity at the inner diameter of the permeable element influences the efficiency of the mass/heat transfer effects. Tangential velocity values of 18 m/sec to 19 m/sec are typical. Other tangential velocity values are also within the spirit and scope of the invention, including values up to and including 20 m/sec, 25 m/sec, and 30 m/sec. Higher velocity values may also be used without departing from the spirit and scope of the invention.

The selection of packing material as permeable element 32 may be influenced by availability of a retainer to retain the packing material during rotation of the rotor 20. The selection of packing is also dependent on providing for dimensional stability of the packing material as the packing and rotor are rotated at the speeds of the present invention. If the packing has insufficient dimensional stability under the rotation speeds of the present invention, then the ability of the packing material to shear and disperse the influent liquid may be insufficient to bring about desired mass transfer. Retention may be achieved by a ring 36, by a meshlike or netlike construction, perforated plate, one or more bands of material, etc. The particular manner of retention of the packing material may be determined by one of ordinary skill in the art without undue experimentation, although advantageous retainers are discussed herein.

The demister 40 is, for example, foamed metal of about 20 ppi. The demister 40 coalesces liquid water and does not disperse the liquid to the extent that the permeable element 32 disperses the liquid, so does not need to have the open area that is desirable for the permeable element 32.

In one embodiment, the invention will remove oxygen from water, such as for boiler water inlet water. In this embodiment, liquid water is fed into the inner chamber 38 via liquid inlet 28. Steam is fed into the chamber 34 via gas inlet 24. The rotor's tangential velocity at the inner diameter is about 18.6 m/sec. The chamber 34 is kept at a pressure from about 3.5 inches $H_2O$ to about 400 inches of $H_2O$ (about 1 atm) above the pressure in the exhaust stack 14.

Preferably, the pressure in the chamber 34 is between about 4 and 5 inches $H_2O$ above the pressure in the exhaust stack 14. The pressure in the exhaust stack 14 is, for example, about 0.5 psig, but any stack pressure may be selected without departing from the spirit and scope of the invention. See discussion below relating to pressure and flow control.

The permeable element 34 is, for example, foamed aluminum, with an axial thickness of about 0.038 meters, an outer diameter of about 0.23 meters, and an inner diameter of about 0.1 meter. Once steady state is achieved, the liquid drained from the chamber 34 through the liquid outlet 30 is essentially free of oxygen. By "essentially free," it is meant that the liquid water has no more than about 500 parts per trillion (ppt) oxygen.

Conventionally, it is desired to maximize the interfacial area of the permeable element 32, by providing greater surface area and greater porosity (more pores per inch), in order to maximize the area on which film will form. The prior art indicates that the maximum amount of film is desirable because the mass transfer occurs at the film boundaries.

In contrast, the present invention is directed to maximizing the amount of liquid water that is sheared and dispersed and provided as extremely small droplets or mist to interact with the gas, in this case, steam. Also, smaller droplets of water are favored. In general, enhancement of the dispersion of the water is favored and promoted over maximizing the film formation.

Thus, in contrast to conventional devices that maximize film-forming area, it is desirable to maximize the number of droplets (dispersion) by increasing the tangential velocity at the inner diameter of the permeable element 32, increasing the pore dimensions of the permeable element 32, and decreasing the interstitial area of permeable element 32. This will increase the number of tiny droplets that are dispersed and not coalesced into a film on a surface of the permeable element 32, increasing the overall interfacial area. It is believed that the mass or heat transfer between the fluids occurs primarily by contact of the steam (second fluid) with the dispersed liquid water (first fluid), and not by contact of the steam with the liquid film formed on the surfaces of the permeable element.

With conventional packed bed mass transfer units, the increased surface area to provide increased film for mass transfer may also lead to increased flooding, because of the higher pressure drops associated with increased surface area. The apparatus 10 of the present invention reduces the flooding potential associated with increased pressure drops because of the relatively small surface area of the permeable element 32.

Without wanting to be bound by any particular theory, about 60% of the mass transfer from the liquid water is believed to occur in the void spaces of permeable element 32, about 30% of the mass transfer of oxygen from the liquid water to the steam occurs in the chamber 34, and about 10% of the mass transfer of oxygen from the liquid water to the steam occurs at the film interfaces within the permeable element 32. As discussed above, the liquid water is directed radially outwardly through the permeable element 32 and is continually coalesced and re-dispersed as it strikes the surfaces of the permeable element 32, thus causing the oxygen molecules that are not near the surface of the water droplet in any single droplet to be near the surface of the droplet in a second droplet after the first droplet coalesces and is sheared into a new droplet. The more finely divided water droplets that are created, the smaller is the individual radius of the droplets, and the greater is the interfacial area and surface area of the droplets that may interact with the steam, with which the exterior of the liquid droplets is in constant contact. The continual coalescing and shearing of the liquid droplets increases the amount of surface area exposed to the steam. Thus, there is more impingement of liquid water on the steam to achieve the mass transfer of oxygen from the liquid water to the steam. This provides greater mass transfer opportunities than conventional mass transfer methods and apparatuses relying on the formation of film for effecting mass transfer. There is more interfacial area available in the dispersed liquid than from liquid film formed on the surfaces of the permeable element.

The flow of the steam in the permeable element 32 is net radially inwardly. The flow of the liquid water in the permeable element 32 is net radially outwardly. While the liquid water and the steam are in the permeable element 32, their respective flow directions are essentially counter-current. This provides for counter-current mass transfer between the liquid water and the steam.

In the chamber 34, the liquid water droplets that have been ejected from the rotating permeable element 32 are still traveling radially outwardly from the permeable element 32. So the liquid droplets have a velocity vector in the radially outward direction. But because of the rotation of the permeable element 32, the liquid water droplets also have a velocity vector in the direction of rotation of the permeable element 32 at the point of release of the droplet from the permeable element 32.

The steam is provided to the chamber 34 in a direction essentially perpendicular to and substantially coplanar with the radius of the permeable element 32. The velocity vector of the entering steam is either in the direction of rotation of the permeable element 32 or exactly opposite the direction of rotation of the permeable element 32, depending on whether the permeable element 32 is rotating clockwise or counter-clockwise. For some applications, it may be advantageous to rotate the permeable element 32 in one direction or the other.

After the steam enters the chamber 34, the pressure differential between the chamber 34 and the exhaust stack 14, described above, causes the steam to move radially inward, across the flow of the liquid droplets. So the velocity of the steam in the chamber 34 has vectors that are both cross-current and counter-current to the velocity vectors of the liquid droplets in the chamber 34.

Thus, the mass transfer between the liquid droplets and the steam occurs in the counter-current and cross-current, directions in the apparatus 10.

The embodiment illustrated in FIG. 4 has the ring 36 removed and the permeable element 32 held in place by one or more stand-offs 48. This arrangement may improve the mass transfer, because there is no coalescing of the dispersed droplets at the ring 36 as the dispersed droplets maneuver through the holes 56 in the ring 36. Thus, there is more dispersed liquid present in the chamber 34 to interact with the steam provided through the gas inlet 24.

Retention of the permeable element 32 by stand-offs 48 also permits a greater liquid flow rate than with the ring 36. The ring 36 provides more resistance to the liquid flow than do the stand-offs 48. Greater resistance to the liquid flow creates a larger pressure drop. A larger pressure drop leads to more rapid flooding and flooding at lower flow rates. While flooding has not been observed to be a problem with the apparatus 10 of the present invention, having less resistance to the liquid flow still provides a greater liquid flow rate possible through the apparatus 10.

Use of the stand-offs 48 also provide better shearing and dispersion of the liquid in the chamber 34 than if the ring 36 is in place. As the liquid droplets encounter the ring 36, there is some amount of coalescence of the fine liquid droplets into larger droplets. If there is no ring 36 that the liquid droplets strike, there is no coalescence of the droplets at the ring 36 before the liquid droplets travel into the chamber 34. The improved shearing and dispersion of the liquid droplets in the chamber 34 improves the mass transfer between these droplets and the steam, as discussed above.

Providing a chamber 34 larger than conventional chambers in rotating packed bed systems has been noted to provide improved overall mass transfer of oxygen from liquid water to steam. In one embodiment, the volume of the chamber 34 outside of permeable element 32 is at least the same as the volume of the permeable element 32. For example, the volume of the chamber 34 outside of the permeable element 32 is between about 1.5 and about 4.0 times the volume of the permeable element 32. The diameter of the chamber 34 may be between about 1.5 and 2.0 times the diameter of the permeable element 32. For example, the diameter of the chamber 34 is about 1.8 times the diameter of the permeable element 32.

There is sufficient space between the lower element 20B and the bottom of the chamber 34 to prevent entraining of any accumulated liquid by the lower element 20B as the rotor 20 rotates. This space between the lower element 20B and the bottom of chamber 34 will have relatively little dispersed liquid, so the mass transfer occurring in this region is small compared to the rest of the apparatus 10. So the lower element 20B is, for example, located as close to the bottom of the chamber 34 as possible without entraining any accumulated liquid. This distance may be selected without departing from the spirit and scope of the invention and may be selected based on the capacity of the liquid outlet 30, the liquid flow rate, or any other parameters.

Conventional rotating packed bed units minimize the area outside of the rotating bed, because the focus of conventional units is on maximizing the surface area available in the rotating bed for formation of film in which the mass transfer occurs. The present invention has the unexpected advantage of increased mass transfer in the chamber 34 by increasing the interaction between steam and dispersed liquid droplets.

The rotating seal 44 prevents the oxygenated steam that leaves the demister 40 from reentering the dispersed liquid/steam mixture present in the chamber 34. The rotating seal 44 also prevents incoming steam in the chamber 34 from bypassing the permeable element 32 and the demister 40 and traveling directly into the exhaust stack 14, thus bypassing the inlet liquid water. The seal 44 is a no-contact seal, such that the rotating parts of the seal 44 do not contact the non-rotating parts of the seal 44.

As illustrated in FIG. 1, the seal 44 includes a rotating arm 62 attached to the rotor 20, a stationary inner arm 65 attached to the housing cap 13, and a liquid seal portion 64. Initially, upon start-up of the apparatus 10, the liquid seal portion 64 has no liquid. As liquid is thrown to the demister 40 from the permeable element 32, the demister 40 forces some of the liquid radially outwardly from the demister 40 into the liquid seal portion 64. If the apparatus 10 is cool upon start-up, then some of the steam exiting the demister 40 will condense and fill the liquid seal portion 64 almost instantly.

The pressure control valve 54 operates to control and regulate the steam provided to the apparatus 10 to maintain constant steam pressure in the exhaust stack 14 and the gas outlet 26. A gas outlet valve 66 is provided in the gas outlet 26 to set the desired constant output of steam exiting the exhaust stack 14. For example, this value is about 30 pounds per hour steam.

Once equilibrium has been reached (see above), if the pressure in the exhaust stack 14 increases above a first predetermined value, then the pressure detector 52 will send a signal to the control valve 54 to throttle the valve to reduce the amount of steam provided through the gas inlet 24. If the pressure in the exhaust stack 14 decreases below a second predetermined value, then the pressure detector 52 will send a signal to the control valve 54 causing the control valve 54 to open and increase the flow of inlet steam through the gas inlet 24 into the chamber 34. This ensures that the pressure in the chamber 34 is always greater than the pressure in the exhaust stack 14. The first and second predetermined values may be the same or different values. These values may be determined based on the desired flow of steam through the gas outlet 26 or on any other basis.

If the gas outlet valve is set such that, for example, 30 pounds per hour of steam is exhausted, and the pressure in the chamber 34 is kept higher than the pressure of the gas outlet 26, then if the feed steam flow rate in gas inlet 24 increases, the pressure in the exhaust stack 14 will increase, and the control valve 54 will throttle to reduce the flow of gas inlet. If, for example, the temperature of the liquid feed in through liquid inlet 28 decreases, then more of the steam in the apparatus 10 will condense, causing the pressure in the exhaust stack 14 to decrease, causing the pressure detector 52 to send a signal to the control valve 54 to open and increase the inlet steam through gas inlet 24 into the chamber 34, thus increasing the pressure in the exhaust stack 14. Therefore, the exhaust steam flow can be held constant, independent of the conditions of the liquid feed, within the design range of the apparatus.

The turndown ratio for this deaerator is much higher than the conventional 10 to 20 found in commercial deaeration units. The turndown ratio of the control valve of the present invention may be as high as 1000, with the potential to be much higher. The minimum controllable flow in the present invention is very small and the normal maximum flow is relatively very large.

In one embodiment, the height or thickness of the permeable element 32 is about 1½ inches, the outer diameter of the rotor 20 is approximately 10 inches, the outer diameter of the permeable element 32 is approximately 9 inches, allowing for the ring 36 to be secured between the upper elements 20A and the lower elements 20B. The inner diameter of the permeable element 32 is approximately 4 inches, resulting in approximately 2½ inches of permeable element 32 between the inner diameter and the outer diameter.

In an embodiment illustrated in FIG. 5, the height of the permeable element 32 is about 2 feet. With the height of the permeable element 32 and the rotor 20 at about 2 feet, bearings 50 may be necessary at the top and/or the bottom of the rotor 20 to provide support for the increased height of the permeable element 32 at the speeds of rotation. By increasing the height of the permeable element 32, the capacity of the apparatus 10 may be increased. Bearings 50 may be placed regardless of the height of the permeable element 32.

The invention has been described in terms of a vertical arrangement, with the axis of rotation of the rotor 20 disposed substantially vertically. It is believed that the apparatus 10 also provides effective mass transfer if the apparatus 10 and/or the rotor 20 are arranged other than vertically, such as substantially horizontally.

While the invention has been described above in terms of deoxygenating liquid water, such as for boiler feed water, the present invention is also applicable to other mass transfer operations, including degasification of liquids. The liquids can range in viscosity from low viscosity solvent liquids, such as water, to highly viscous liquids such as emulsions, oils, biological fluids, and polymer melts. As mentioned above, use of a high viscosity liquid may result in filaments disposed in the permeable element 32 and the chamber 36. Gasses that can be removed by the present invention include oxygen, nitrogen, carbon dioxide, and methane.

Other mass transfer operations, including dehydration of an oil/water emulsion, may be accomplished. For example, if a liquid oil/water emulsion is present, such emulsion may be the liquid entering the apparatus 10 through liquid inlet 28. A stripping gas, such as nitrogen, carbon dioxide, dry air, or any other gas with a greater affinity for water than the affinity of the oil for water may be used as the inlet gas provided into the chamber 34 through gas inlet 24. Further, a vacuum may be used as an alternative to stripping gas. A fixed container of oil/water emulsion may be provided as the source of liquid to liquid inlet 28, and the product liquid exiting liquid outlet 30 directed to another container. In this manner, the apparatus 10 may be used in a batch process to remove water from a fixed volume of water/oil emulsion.

Because the water has a higher volatility than the oil, raising the temperature of the emulsion such that the water evaporates and the oil remains in liquid enables the stripping gas to entrain the water or become humidified to strip the water from the oil/water emulsion. Alternatively, a vacuum may be applied at the gas outlet 26 instead of using a stripping gas provided through gas inlet 24 such that the evaporated water is then removed through the demister 40 and the gas outlet 26, while the liquefied oil exits the apparatus 10 through the liquid outlet 30. This dehydration may be conducted as a batch or a continuous process. Such a batch process using vacuum may reduce the amount of water in the emulsion to less than 100 parts per million. If the liquid from liquid outlet 30 is recycled to liquid inlet 28, then the removal of water from the emulsion may proceed to even lower concentrations, as desired.

As discussed above, the apparatus 10 of the present invention may be used for mass transfer operations in either batch or continuous operations. Other suitable operations include humidification or dehumidification of air or other gas, distillation, a gas scrubber, such as for oil fumes or fumes from the grill of a restaurant, reactive distillation, reactive packed bed, etc. The apparatus 10 of the present invention may also be arranged in more than one unit in series or parallel to effect mass transfer on a scale unavailable to a single unit.

The method and apparatus of the present invention may also be used to effect heat transfer between two fluids. As set forth above, when a first fluid at a first temperature is provided through the liquid inlet 28 and a second fluid at a second temperature is provided through the gas inlet 24, heat transfer between the two fluids will occur, bringing the two fluids to an equilibrium temperature. The shearing and re-shearing of the first fluid as it travels through the permeable element 32 increases the interfacial area of the first fluid to interact with the second fluid to transfer the heat from one fluid to the other. Specific flow rates, pressures, inlet temperatures, etc., may be determined without undue experimentation to bring about the desired amount of heat transfer between the first fluid and the second fluid.

EXAMPLES

Each of examples 1 through 7 illustrated in Table 1 were conducted with a rotor packing material of solid aluminum foam metal, about 400 pores/m with an interfacial area of about 740/m, about 0.23 m O.D and about 0.1 m I.D, and about 0.038 m axial thickness. In all examples the tangential velocity at the inner diameter was about 18.6 m/sec. The steam pressure in the chamber 34 was about 0.013 atm (about 5 inches of $H_2O$) above the pressure in the exhaust stack 14. The condensate flow refers to the flow of condensate from condenser 67 through condensate outlet 69. The oxygen content of the product flow at liquid outlet 30 was measured by a Rosemount trace dissolved oxygen sensor.

TABLE 1

Liquid Water Deoxygenation

| Example | Liquid inlet Flow Rate ($m^3/h$) | Liquid inlet temperature (° C.) | ppb $O_2$ of product flow | Condensate Flow Rate ($m^3/h$) |
|---|---|---|---|---|
| 1 | .23 | 80 | <0.5 | $6 \times 10^{-3}$ |
| 2 | .45 | 80 | <0.5 | $3.2 \times 10^{-3}$ |
| 3 | 2 | 60 | <0.5 | $15 \times 10^{-3}$ |
| 4 | 4 | 95 | <0.5 | $4 \times 10^{-3}$ |
| 5 | 4 | 70 | <0.5 | $4 \times 10^{-3}$ |
| 6 | 4 | 80 | <0.5 | $4 \times 10^{-3}$ |
| 7 | 4 | 80 | <0.5 | $18 \times 10^{-3}$ |

In each of the examples, the oxygen measured in the product liquid/condensate was less than about 0.5 ppb or 500 ppt. By comparison, conventional deaerators have not achieved below 5 ppb dissolved oxygen. Thus, the removal of oxygen to less than 500 ppt is a surprising and advantageous result.

Examples 8-16

Table 2 illustrates examples 8 through 16 in which 50 liters of an oil/water mixture was fed to an apparatus in accordance with the present invention. In this example, no stripping gas was used. The apparatus was evacuated by a vacuum pump, and maintained at 13 mm Hg pressure absolute. The mixture flow rate is given in column Q liters/hour. The initial water content of the feed (water doped oil-water mixture) is given in the column N#1. Columns N#2-N#4 show the water content after successive runs in a batch process. The tangential speed (TS) at the inner diameter is given in the column TS.

TABLE 2

Removal of Water From Oil by Vacuum

| Example | T(C.) | Q (l/hr) | TS (m/s) | N#1 (ppm) | N#2 (ppm) | N#3 (ppm) | N#4 (ppm) |
|---|---|---|---|---|---|---|---|
| 8 | 70 | 200 | 9.4 | 450 | 113 | 63 | 51.5 |
| 9 | 60 | 200 | 9.4 | 382 | 169 | 78 | 69.2 |
| 10 | 50 | 200 | 9.4 | 409 | 175 | 98.8 | 75.6 |
| 11 | 60 | 200 | 9.4 | 382 | 169 | 98 | 69.2 |
| 12 | 60 | 200 | 7.8 | 420 | 217 | 92.3 | 85 |
| 13 | 60 | 200 | 6.3 | 325 | 175 | 95.5 | 86.4 |
| 14 | 60 | 100 | 9.4 | 404 | 101.2 | 60.8 | 53 |
| 15 | 60 | 200 | 9.4 | 382 | 169 | 78 | 69.2 |
| 16 | 60 | 300 | 1200 | 366 | 157 | 80.5 | 70.8 |

As can be seen from Table 2, the concentration of the water in the oil/water mixture decreased with each successive run, such that less than 100 ppm water remained in the mixture.

Another example of the transfer of mass from one fluid to another by the present invention is remediation of liquids having contaminants, such as the removal of volatile organic compounds (VOCs) from water. VOCs include, but are not limited to, benzene, toluene, ethylbenzene, and xylene. This removal is useful, for example, in remediation of groundwater, effluent streams, and other remediation processes.

The first fluid provided in liquid form is water having VOCs therein. The liquid with VOCs is provided into the apparatus 10 via liquid inlet 28. Air or some other gas is provided via gas inlet 24. Additionally, a vacuum may be applied instead of or in addition to a gaseous stripping medium.

Tests were conducted in which liquid water at ambient temperature with known concentration of VOCs was provided at a flow rate of about 8 gallons per minute. A permeable element 32 of about 5 ppi foam metal, inner diameter of about 4.02 inches and outer diameter of about 8.98 inches was rotated at about 3450 rpm. Air at ambient temperature was used as the second fluid. Greater than 90% of some VOCs were removed from the liquid water. It is believed that preheating the liquid water having VOCs above ambient temperature would improve removal of the VOCs.

The following table illustrates removal of VOCs at various gas flow rates from two samples of water having VOCs. The gas flow rates are estimated.

TABLE 3

Removal of VOCs From Water

| Liquid Flow Rate (Gal/Min) | Air Flow Rate (cuft/min) | Benzene (ppm) | Toluene (ppm) | Ethyl-Benzene (ppm) | Xylene (ppm) |
|---|---|---|---|---|---|
| SAMPLE A | 0 | 0.344 | 0.67 | 0.068 | 0.334 |
| 8 | 8 | 0.097 | 0.227 | 0.013 | 0.079 |
| 8 | 12 | 0.03 | 0.087 | 0.006 | 0.03 |
| SAMPLE B | 0 | 1.923 | 5.162 | 0.32 | 2.367 |
| 8 | 9.7 | 0.368 | 1.129 | 0.034 | 0.361 |
| 8 | 11.8 | 0.279 | 0.93 | 0.027 | 0.284 |
| 8 | 12.2 | 0.261 | 0.869 | 0.022 | 0.251 |

Circulating the product liquid that has been treated through the apparatus one or more times results in further removal of VOCs. For example, a test was conducted in which the treated water was recycled through the apparatus two additional times. The liquid flow rate was 8 gal/min. and the air flow rate was 12 $ft^3$/min. The temperature was ambient temperature. The following table illustrates the removal of selected VOCs after the passes through the apparatus. The values listed are those measured after each successive pass through the apparatus.

TABLE 4

Recycled Remediation Liquid

| | Benzene (ppm) | Toluene (ppm) | Ethylbenzene (ppm) | Xylene (ppm) |
|---|---|---|---|---|
| Initial Sample | 0.149 | 0.806 | 0.098 | 0.544 |
| Pass #1 | 0.021 | 0.175 | 0.014 | 0.111 |

TABLE 4-continued

Recycled Remediation Liquid

| | Benzene (ppm) | Toluene (ppm) | Ethylbenzene (ppm) | Xylene (ppm) |
|---|---|---|---|---|
| Pass #2 | 0.005 | 0.023 | <0.005 | 0.03 |
| Pass #3 | <0.005 | 0.006 | <0.005 | 0.006 |

While the present invention has been illustrated by the above description of embodiments, and while the embodiments have been described in some detail, it is not the intent of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept.

We claim:

1. A mass or heat transfer apparatus for transferring a substance or heat from a first fluid to a second fluid, comprising:
   a) a rotatable permeable element disposed within a chamber the rotatable permeable element, as a whole, having a porosity of less than about 40 pores inch, the rotatable permeable element defining an inner diameter and an interior region, the apparatus being structured to drive the rotatable permeable element such that the tangential velocity at its inner diameter is at least about 18 meters per second;
   b) at least one liquid inlet for introducing the first fluid into the interior region;
   c) at least one gas inlet for introducing the second fluid into the chamber;
   d) at least one gas outlet for removing the second fluid from the interior region and;
   e) at least one liquid outlet for removing the first fluid from the chamber.

2. The apparatus of claim 1, wherein the permeable element comprises a porous solid.

3. The apparatus of claim 1, wherein the permeable element comprises foamed metal.

4. The apparatus of claim 3, wherein the foamed metal comprises foamed aluminum.

5. The apparatus of claim 1, wherein the liquid inlet comprises at least one nozzle through which the first fluid is introduced to the interior region.

6. The apparatus of claim 1, further comprising a control apparatus to control the flow of the second fluid into the chamber based on pressure at the at least one gas outlet.

7. The apparatus of claim 6, wherein the control apparatus comprises a pressure detector in communication with the at least one gas outlet and a valve in communication with the pressure detector for controlling the flow of second fluid into the chamber through the gas inlet.

8. A mass or heat transfer apparatus for transferring a substance or heat from a first fluid to a second fluid, comprising:
   a) a rotatable permeable element disposed within a chamber and defining an interior region, the permeable element being configured to enhance dispersion of a first fluid;
   b) at least one liquid inlet for introducing the first fluid into the interior region;
   c) at least one gas inlet for introducing the second fluid into the chamber;
   d) at least one gas outlet for removing the second fluid from the interior region;
   e) at least one liquid outlet for removing the first fluid from the chamber; and
   f) a demister located in the interior region through which the second fluid passes before removal through the gas outlet.

9. The apparatus of claim 1, further comprising a housing in which the chamber is disposed and wherein the permeable element is disposed within a rotor.

10. The apparatus of claim 9, further comprising a rotating seal disposed between the housing and the rotor.

11. Apparatus for accomplishing heat and/or mass transfer between a liquid feed and a second fluid or for extracting a volatile component from the liquid feed, the apparatus comprising:
    a) chamber,
    b) a rotatable permeable element disposed within the chamber, the permeable element defining a permeable element volume, an interior region for receiving the liquid feed and an inner diameter, the rotatable permeable element, as a whole, having a porosity of less than about 40 pores per inch, the apparatus being structured to drive the rotatable permeable element such that the tangential velocity at its inner diameter is at least about 18 meters per second;
    c) a liquid feed inlet for introducing the liquid feed into the interior region of the rotatable permeable element for permeation through the rotatable permeable element and collection by the chamber;
    d) a liquid outlet for removing liquid feed collected by the chamber; and
    e) a second fluid outlet for removing the second fluid or volatile component from the interior region of the rotatable permeable element;
    wherein the chamber defines a chamber volume outside the rotatable permeable element and further wherein the chamber volume outside the rotatable permeable element is at least as large as the permeable element volume.

12. The apparatus of claim 11, wherein the chamber volume outside the rotatable permeable element is about 1.5 to about 4 times as large as the permeable element volume.

13. The apparatus of claim 12, wherein the diameter of the chamber is about 1.5 to about 2 times as large as the diameter of the permeable element.

14. The apparatus of claim 11, wherein the porosity of the rotatable permeable element is less than about 20 pores per inch.

15. The apparatus of claim 11, wherein the rotatable permeable element defines an open interior region defined by an inner wall, the apparatus further comprising a motor structured to drive rotation of the rotatable permeable element such that the tangential velocity of the inner wall is about 18-30 m/sec.

16. The apparatus of claim 11 for use in accomplishing heat and/or mass transfer between a liquid feed and a second fluid, the apparatus further comprising a second fluid inlet for introducing the second fluid into the chamber for permeation of the second fluid through the rotating permeable element and discharge of the second fluid from the interior region of the rotatable permeable element.

17. The apparatus of claim 11, further comprising a demister located in the interior region through which the second fluid passes before removal through the gas outlet.

18. The apparatus of claim 11, wherein the rotatable permeable element is formed from at least one of metal, glass and plastic in the form of a foam, gauze, wool, tape or wire, and further wherein the porosity of the rotatable permeable element is about 20 pores per inch or less.

19. The apparatus of claim 11, wherein the porosity of the rotatable permeable element is about 10 pores per inch or less.

20. The apparatus of claim 19, wherein the rotatable permeable element is in the form of a foam.

21. The apparatus of claim 19, wherein the porosity of the rotatable permeable element is less than about 3 pores per inch or less.

22. The apparatus of claim 19, wherein the apparatus is structured to drive the rotatable permeable element such that the tangential velocity at its inner diameter is at about 18-30 meters per second.

23. The apparatus of claim 22, wherein the apparatus is structured to drive the rotatable permeable element such that the tangential velocity at its inner diameter is at least about 25 meters per second.

24. The apparatus of claim 1, wherein the rotatable permeable element is formed from at least one of metal, glass and plastic.

25. The apparatus of claim 24, in which the rotatable permeable element is in the form of a foam, gauze, wool, tape or wire, and further wherein the porosity of the rotatable permeable element is about 20 pores per inch or less.

26. The apparatus of claim 25, wherein the porosity of the rotatable permeable element is about 10 pores per inch or less.

27. The apparatus of claim 26, wherein the porosity of the rotatable permeable element is less than about 3 pores per inch or less.

28. The apparatus of claim 25, wherein the apparatus is structured to drive the rotatable permeable element such that the tangential velocity at its inner diameter is at about 18-30 meters per second.

29. The apparatus of claim 28, wherein the apparatus is structured to drive the rotatable permeable element such that the tangential velocity at its inner diameter is at least about 25 meters per second.

* * * * *